United States Patent
King et al.

(10) Patent No.: US 8,562,792 B2
(45) Date of Patent: Oct. 22, 2013

(54) VAPOR AND LIQUID FLOW CONTROL IN A DIVIDING WALL FRACTIONAL DISTILLATION COLUMN

(75) Inventors: Stephen Thomas King, Villa Park, IL (US); Joe Haas, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 434 days.

(21) Appl. No.: 12/914,450

(22) Filed: Oct. 28, 2010

(65) Prior Publication Data
US 2012/0103013 A1 May 3, 2012

(51) Int. Cl.
B01D 3/10 (2006.01)

(52) U.S. Cl.
USPC ............... 203/81; 203/99; 202/158; 202/160

(58) Field of Classification Search
USPC ............... 202/158, 160; 203/81, 99; 196/111
See application file for complete search history.

(56) References Cited

U.S. PATENT DOCUMENTS

| | | | |
|---|---|---|---|
| 2,471,134 A | 5/1949 | Wright | |
| 4,230,533 A | 10/1980 | Giroux | |
| 6,347,533 B1 | 2/2002 | Tung | |
| 6,551,465 B1 | 4/2003 | Van Zile et al. | |
| 6,558,515 B1 | 5/2003 | Steacy | |
| 6,645,350 B1 * | 11/2003 | Steacy | 202/158 |
| 6,846,389 B2 * | 1/2005 | Kaibel et al. | 203/1 |
| 7,267,746 B1 * | 9/2007 | Harris et al. | 202/160 |
| 7,424,999 B2 | 9/2008 | Xu et al. | |
| 7,622,034 B1 * | 11/2009 | Thakkar et al. | 208/210 |
| 7,713,386 B2 * | 5/2010 | Schultz et al. | 196/111 |
| 7,951,290 B2 * | 5/2011 | Thakkar et al. | 208/210 |
| 2008/0161618 A1 | 7/2008 | Zimmermann et al. | |
| 2008/0293986 A1 | 11/2008 | Schultz et al. | |
| 2009/0266107 A1 | 10/2009 | Singh et al. | |
| 2009/0288939 A1 | 11/2009 | Smith et al. | |
| 2010/0018248 A1 | 1/2010 | Fieler et al. | |
| 2010/0224536 A1 | 9/2010 | Schultz et al. | |

OTHER PUBLICATIONS

Wang, San-Jang et al.; "Controllability and energy efficiency of a high-purity divided wall column"; Source: Chemical Engineering Science, v. 62, n. 4, p. 1010-1025, Feb. 2007.

Ling, Hao et al.; "New control structure for divided-wall columns"; Source: Industrial and Engineering Chemistry Research, v. 48, n. 13, p. 6034-6049, Jul. 1, 2009.

Slade, Bernie et al.; "Dividing wall column revamp optimises mixed xylenes production"; Source: AIChE Annual Meeting, Conference Proceedings, 2006, 2006 AIChE Spring National Meeting.

(Continued)

Primary Examiner — Nina Bhat
(74) Attorney, Agent, or Firm — Mark R Willis (57) ABSTRACT

Dividing wall fractional distillation columns and methods of operating these columns with greater flexibility, especially in terms of the ability to adjust the composition of the heartcut, intermediate or sidecut product fraction, are described. In particular, this composition may be advantageously "biased" toward higher or lower molecular weight components, depending on operating needs. Changes in feedstock composition may also be managed more effectively. These benefits are obtained by varying the flow rate of vapor and liquid to each side of the dividing wall. The vapor flowrate rising from an undivided portion of the column interior below the dividing wall is varied to the feed and/or product sections on opposite sides of the dividing wall. Also, the liquid flowrate falling from an undivided portion of the column interior above the dividing wall is varied to the feed and/or product sections on opposite sides of the dividing wall.

19 Claims, 3 Drawing Sheets

(56) References Cited

OTHER PUBLICATIONS

Dejanovic, I. et al.; "Dividing wall column—A breakthrough towards sustainable distilling"; Source: chemical Engineering and Processing: Process Intensification, v. 49, n. 6, p. 559-580, Jun. 2010.

"The Chemical Engineer", Thermal Coupling; Aug. 27, 1992; p. s14.

Nelson, L. et al.; "Modeling of Energy Efficient Dividing-Wall Distillation Columns"; Source: Clarkson University Honors Program, Chemical Engineering, Department of Chemical and Biomolecular Engineering, class of 2009; p. 110-113.

* cited by examiner

VAPOR AND LIQUID FLOW CONTROL IN A DIVIDING WALL FRACTIONAL DISTILLATION COLUMN

FIELD OF THE INVENTION

The present invention relates to dividing wall distillation columns processes using the columns, for performing fractional distillation of an impure feed (e.g., comprising hydrocarbon components having a range of carbon atom numbers and boiling points). Varying the vapor flows to feed and product sections on opposite sides of the wall allows characteristics (e.g., the composition) of the sidecut product to be modified or controlled.

DESCRIPTION OF RELATED ART

Distillation accounts for a significant amount of the overall energy usage in many industries, including crude oil refining and petrochemical production. Although over 40,000 distillation columns are used in a broad range of commercial applications, distillation in general is nevertheless characterized as having low energy efficiency.

Distillation is a separation process that exploits differences (sometimes minor) in component relative volatilities or boiling points. Generally a high degree of purity of component A (e.g., propane, having three carbon atoms) and component B (e.g., n-butane, having four carbon atoms) can be achieved by distilling an impure mixture of these components. This assumes that the distillation column used provides, in view of the relative volatility difference, a sufficient number of theoretical stages of vapor-liquid equilibrium contacting and that an azeotropic mixture of the components is not formed at a composition below the desired purity.

When separating a mixture of three components A, B, and C (or three fractions that may themselves be mixtures of components) at least two simple distillation columns are required, if each is only capable of separating a feed stream into two product streams, namely an overhead product enriched in the low boiling component(s) and a bottoms product enriched in the high boiling component(s). For example, a first column may be used to resolve the low boiling point component A, in a first column overhead product, from a mixture of B and C, in a first column bottoms product. A second column can then be used to resolve intermediate boiling point component B in the second column overhead product, from high boiling component C in the second column bottoms product. In an alternative arrangement, the first column is used to resolve a mixture of A and B in the overhead product and C in the bottoms product, while the second column resolves components A and B from the first column overhead product, into component A and component B in second column overhead and bottoms products, respectively.

In another mode of purifying three components or fractions using simple distillation columns, a mixture of A and B is obtained as the overhead product, and a mixture of B and C is obtained as the bottoms product, of a first distillation column, namely a prefractionator. Two secondary columns are then required for the remaining separations, such that component or fraction B is purified in both the overhead product of one of these secondary columns (resolving C in the bottoms product) and the bottoms product of the other of these secondary columns (resolving A in the overhead product). If (i) these secondary columns are joined in the middle, (ii) component or fraction B is removed as a sidestream or sidecut product, and (iii) other streams of the secondary columns are recycled back to the prefractionator, the result is known as a Petyluk arrangement. When both columns of the Petyluk arrangement are placed within a common vessel, it becomes a dividing wall fractional distillation column Combining the columns in a single shell allows for significant gains in energy efficiency due to the sharing of bottoms reboiler and overhead condenser duties.

Dividing wall fractional distillation columns have been used for separating hydrocarbon mixtures, as described in U.S. Pat. No. 2,471,134. Recently, the applications for dividing wall columns have expanded with increasing recognition that dividing wall columns can often provide superior performance and/or lower cost, compared to conventional fractional distillation columns or multiple columns in a distillation train. A specific application in which such advantages are realized, for example, is described in *Thermal Coupling for Energy Efficiency*, supplement to THE CHEMICAL ENGINEER, page s14 (Aug. 27, 1992). The operating and control parameters for dividing wall columns, however, are not as well as developed and understood, relative to the parameters for conventional columns. Some important considerations with respect to dividing wall fractional distillation columns are discussed in U.S. Pat. No. 6,551,465 and U.S. Pat. No. 4,230,533, both of which describe collecting liquid in an upper portion of the column and dividing this liquid between the two separate sides of the dividing wall.

Improvements in the operation and control of dividing wall fractional distillation columns are continually being sought. It is particularly desirable in this art to improve flexibility in terms of adjustments to properties, such as composition, of the sidecut or intermediate product fraction. Alternatively, such improvements can offer a superior response to changes, such as in the feed composition, if a constant sidecut composition is the goal.

SUMMARY OF THE INVENTION

The present invention is associated with the discovery of dividing wall fractional distillation (fractionation) columns and methods of operating these columns with greater flexibility, especially in terms of the ability to adjust the composition of the sidecut or intermediate product fraction. In particular, this composition may be advantageously "biased" toward higher or lower molecular weight (or higher or lower boiling) components, depending on operating needs. Otherwise, changes in feedstock composition may be managed more effectively. These benefits are obtained by varying the flow rate of vapor, for example rising from an undivided portion of the column interior below the dividing wall, to feed and product sections on opposite sides of the dividing wall. According to specific embodiments these vapor flow rates are varied in combination with the flow rate of liquid, for example falling from an undivided portion of the column interior above the dividing wall to the feed and product sections. According to exemplary embodiments, a ratio of vapor flows to the feed and product sections ($V_p/V_f$ ratio) and/or a ratio of liquid flows to these sections ($L_p/L_f$ ratio) may be controlled or monitored. Control of ratios may be performed in conjunction with the control of the total vapor flow rate ($V_p+V_f$) and/or the total liquid flow rate ($L_p+L_f$). According to an exemplary type of feedback control, the $V_p/V_f$ ratio and/or $L_p/L_f$ ratio are controlled in response to the measured composition of the sidecut product.

The ability to vary vapor flow rates to sections of the dividing wall fractional distillation column provides a significantly greater breadth of sidecut compositions achievable for a given fractionation operation, compared to varying liquid flow rates alone. A substantial improvement results, in terms of the extent to which this composition may be changed (e.g., to favor higher or lower molecular weight components).

Accordingly, embodiments of the invention are directed to a distillation column comprising a dividing wall separating the column into interior, parallel feed and product sections. The column further comprises an upper liquid collection system for blocking downward liquid flow across all or substantially all of an upper cross section of the column and a vapor isolation system located below the upper liquid collection system for blocking upward vapor flow across all or substantially all of a lower cross section of the column Advantageously, one or more vapor conduits provide fluid communication from below the vapor isolation system to either or both of both the feed and product sections of the dividing wall fractional distillation column. Optionally, one or more upper liquid conduits provide fluid communication from above the upper liquid collection system to either or both of the feed and product sections of the dividing wall fractional distillation column.

Further embodiments of the invention are directed to a method for fractional distillation of a feed into at least an overhead product, a bottoms product, and a sidecut product. The method comprises passing a feed to the feed section of a representative dividing wall fractional distillation column as described above. Representative feeds comprise hydrocarbons, and especially mixtures of hydrocarbons, having from about 4 to about 12 carbon atoms (e.g., a mixture of naphtha boiling range, $C_5$-$C_{11}$, hydrocarbons). Such feeds include straight-run or processed hydrocarbon fractions derived from crude oil, with representative feeds comprising refinery operation reaction and/or separation products (e.g., products of hydrocracking, fluid catalytic cracking, isomerization, hydrogenation, dehydrogenation, alkylation, etc. or products of adsorptive or distillative separations, such as the adsorptive separation of branched hydrocarbons from straight-chain hydrocarbons). In addition to a broader range of hydrocarbons, other suitable feeds include those having components comprising carbon and heteroatoms such as oxygen, sulfur, and/or nitrogen (e.g., alcohols, esters, ethers, thiols, thioesters, thioethers, amines, pyridines, etc.) or having inorganic components.

Yet further embodiments of the invention are directed to a method for fractionating a hydrocarbon-containing feed. The method comprises passing the feed into a feed section of a dividing wall distillation column having an interior separated into parallel feed and product sections by a vertically extending dividing wall. The method further comprises blocking upward vapor flow across all or substantially all of a lower cross section of the column with a vapor isolation system (e.g., located below the dividing wall), and flowing vapor from below the vapor isolation system to both the feed and product sections of the dividing wall fractional distillation column. The method further comprises withdrawing overhead, sidecut, and bottoms products, enriched in low-, intermediate-, and high-boiling hydrocarbons, respectively. Advantageously, according to particular embodiments, a ratio of product section vapor flow to feed section vapor flow ($V_p/V_f$ ratio) may be controlled or monitored. For example, as discussed above, the $V_p/V_f$ ratio is controlled in response to a desired or measured characteristic (e.g., composition) of the sidecut product.

Still further embodiments of the invention are directed to a method for fractionating a liquid feed. The method comprises monitoring or controlling vapor flows to feed and product sections on opposite sides of an internal, vertically oriented dividing wall of a fractional distillation column.

These and other embodiments and aspects relating to the present invention are apparent from the following Detailed Description.

BRIEF DESCRIPTION OF THE DRAWINGS

The features referred to in FIG. 1 are not necessarily drawn to scale and should be understood to present an illustration of the invention and/or principles involved. Some features depicted have been enlarged or distorted relative to others, in order to facilitate explanation and understanding. Dividing wall fractional distillation columns, as well as methods using these columns, will have configurations, components, and operating parameters determined, in part, by the intended application and also the environment in which they are used.

DETAILED DESCRIPTION

The present invention is associated with the discovery of important advantages gained from the ability to control vapor flows, optionally in conjunction with liquid flows, to both feed and product sections of a dividing wall fractional distillation column. Such columns, which have proven useful in a number of industries, include as one of their basic components a substantially fluid tight vertical wall extending through a significant portion of their height and located in a central portion (e.g., in a plane that includes or is proximate the vertical axis) of the column to divide this central portion into at least two vertical, parallel vapor-liquid contacting sections. The top and bottom of the wall terminate in the column at a point distant from the respective ends of the column such that there is open communication across the column interior above the top and below bottom of the dividing wall. Therefore, vapor leaving the top of each section and liquid leaving the bottom of each section flow into common, upper and lower sections where they are mixed. Components of the feed leaving one of the feed or products sections can then cross the dividing wall and enter the other of these parallel sections or otherwise continue toward the top or bottom end of the column. Each of the feed and product sections, and generally the upper and lower sections, contain fractionation trays and/or packing intended to promote the desired separation, for example, of hydrocarbon components of a feed.

The feed (or feed stream) to the column enters the feed section of the dividing wall fractional distillation column, typically at or near a vertically central location, but possibly also near the top or bottom of the feed section. Operation of the column results in fractionation of the feed into at least three different product streams. Two of these, namely the net overhead product and net bottoms product, are removed or withdrawn from the common, upper and lower sections of the column, in a manner similar to that of a conventional column. The other product, referred to herein as the "sidecut product"

(or "heartcut product") is removed from the product section of the dividing wall fractional distillation column, typically at or near a vertically central location, but possibly also near the top or bottom of the product section. As discussed above, the separations performed in dividing wall fractional distillation columns are comparable to those performed using multiple, separate distillation columns, and therefore the operating conditions are similar. Depending on the particular fractionation to be performed, representative pressures can range from below atmospheric (i.e., vacuum pressure) to 100 bar (1450 psig) or more. Representative temperatures can range from about 10° C. (50° F.) to about 350° C. (662° F.) or more. Cryogenic operations at lower temperatures can also be performed.

Aspects of the present invention are associated with improvements in operating flexibility of dividing wall fractional distillation columns, especially in terms of a broader range of sidecut product compositions that may be achieved for a given feedstock and flowrate, using a column having a given set of specifications (e.g., diameter, theoretical vapor-liquid equilibrium stages, and feed entry and product withdrawal points). Alternatively, this improved flexibility can translate to a broader range of feedstock compositions that can be used to provide a specified sidecut product composition, thereby allowing a dividing wall column to better tolerate changes in feedstock composition originating, for example, from an upset in an upstream unit operation.

These important benefits are obtained by varying the flows of rising vapor into the feed and product sections on opposite sides of the dividing wall. This may be performed independently of, or otherwise in conjunction with, varying the flows of falling liquid into these sections. For example, according to a particular embodiment of the invention, a ratio of product section vapor flow to feed section vapor flow ($V_p/V_f$ ratio) may be controlled simultaneously with a ratio of product section liquid flow to feed section liquid flow ($L_p/L_f$ ratio). Overall, the flows of vapor, optionally in conjunction with the flows of liquid, can be varied to each side of a dividing wall fractional distillation column to vary the composition of the sidecut product, control this composition, and/or manage changes in feedstock composition.

Figure 1:
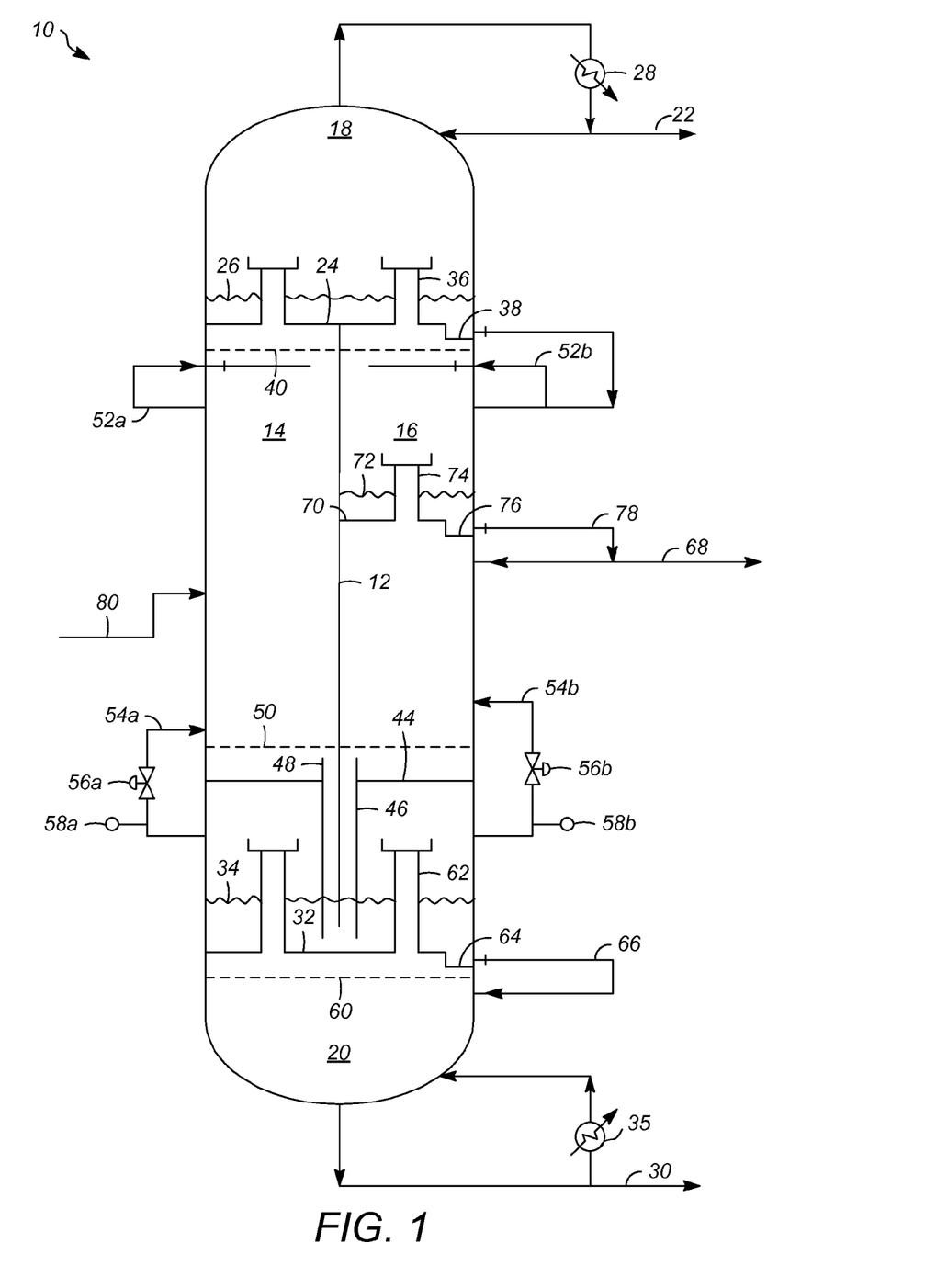
FIG. 1 is a side, cut-out view of a representative dividing wall distillation column according to a particular embodiment of the invention, in which vapor from below a vapor isolation system is passed to both the feed and product sections of the column, on opposite sides of the dividing wall.

FIG. 1 illustrates a particular dividing wall distillation column 10 according to a representative embodiment of the invention. A vertically elongated dividing wall 12, located substantially centrally in the interior of column 10, separates a significant portion of the column interior, along the column height, into feed section 14 and product section 16. For simplicity, conventional vapor-liquid contacting devices such as trays or packing materials are not shown, although these contacting devices are present throughout feed and product sections 14, 16, where they extend across only a portion of the column diameter in these respective sections. Such contacting devices are also generally present in common, upper and lower sections 18, 20, which may be positioned above and below dividing wall 12.

As illustrated in the particular embodiment of FIG. 1, feed inlet conduit 80 communicates with feed section 14 of column 10, and normally terminates at a flow distributor (not shown) within the column. Also, net overhead product withdrawal conduit 22 communicates with upper section 18 of the column, above upper liquid collection system 24 that maintains upper liquid level 26, generally over an entire cross section of column 10. More specifically, according to this embodiment, net overhead product withdrawal conduit 22 communicates through an overhead liquid condensation and reflux system that includes overhead condenser 28, which, although shown as an external condenser, may alternatively be an internal condenser. One or multiple condensers may be used, as well as the same or different types of condensers (e.g., air and water cooled condensers) to control, in conjunction with an overhead receiver or reflux drum (not shown) and an overhead reflux pump, flow device, and control valve (not shown) (i) the extent of condensation of vapor removed from upper section 18, (ii) the extent of condensed liquid returned to, and overhead product withdrawn from, this section, and (iii) the column temperature in this section.

Likewise, net bottoms product withdrawal conduit 30 communicates with lower section 20 of the column, below lower liquid collection system 32 that maintains lower liquid level 34, generally over an entire cross section of column 10. More specifically, according to this embodiment, net bottoms product withdrawal conduit 30 communicates through a bottoms liquid reboiling system that includes bottoms reboiler 35, which, although shown as an external reboiler, may alternatively be an internal reboiler. One or multiple reboilers may be used, as well as the same or different types of reboilers to control, in conjunction with a bottoms circulation control valve (not shown) (i) the extent of vaporization of liquid removed from lower section 20, (ii) the extent of vaporized liquid returned to, and bottoms product withdrawn from, this section, and (iii) the column temperature in this section. Other measurement systems (e.g., for temperature measurement) may be used in the overhead liquid condensation and reflux system and/or the bottoms liquid reboiling system, often as part of a control loop.

The column of FIG. 1 includes upper liquid collection system 24, located below common, upper section 18 and above dividing wall 12. It is also possible in alternative embodiments for the dividing wall to extend above upper liquid collection system 24. Upper liquid collection system 24 comprises a first solid tray portion, which can include multiple tray sections, for blocking internal, downward liquid flow across all or substantially all of an upper cross section 40 of the column. This cross section may correspond to that in which all or some of the solid tray portion of upper liquid collection system 24 resides. Preferably all internal downward liquid flow is blocked across upper liquid collection system 24 which may, for example, include blind tray sections having vertically extending, capped upper vapor risers 36. Liquid collection system 24 preferably lacks a liquid downcomer, such that internal downward liquid flow is prevented as long as upper liquid level 26 is maintained below the vertical height of upper vapor risers 36. As shown in FIG. 1, upper liquid collection system 24 is not necessarily coplanar, but may include features such as upper vapor risers 36 and/or collection well 38, extending above and/or below the plane of the solid tray portion. According to a particular embodiment, upper liquid collection system 24 comprises a solid tray, such as a chimney tray, extending over a circular cross section of the column and further comprises a plurality of vapor risers.

According to the embodiment shown in FIG. 1, upper liquid conduits 52a, 52b are used to provide liquid flow from above upper liquid collection system 24 to both feed and product sections 14, 16 on opposite sides of dividing wall 12. Both upper liquid conduits 52a, 52b, which provide fluid communication to feed and product sections 14, 16, are shown in FIG. 1 as being external to the column and thereby readily controlled using control valves and flow measurement systems (not shown). Material in liquid conduits, 52a and/or 52b, may be conveyed to feed and product sections 14, 16 using pumps (not shown) or otherwise via gravity in the case of a free draining system. It is also possible for conduits 52a, 52b to be located within the column, in which case the first solid tray portion of upper liquid collection system 24 can still function to block internal, downward liquid flow when the control valves or other liquid flow control devices are completely closed or blocked. Conduits 52a, 52b for the delivery of liquid flows from above to below upper cross section 40 normally terminate at liquid flow distributors (not shown) within the column. Since generally no liquid product is removed from upper liquid collection system 24, the total flow of liquid withdrawn is normally returned as reflux, using an upper liquid reflux system, through upper liquid conduits 52a, 52b to either or both of the feed and product sections 14, 16. According to other embodiments, some liquid product may be removed (e.g., for sampling) or even a substantial quantity may be removed from upper liquid collection system 24 as a liquid product.

The column of FIG. 1 further includes a net sidecut product withdrawal conduit 68 that communicates with only product section 16 of the column, above sidecut liquid collection system 70 that maintains sidecut liquid level 72. More specifically, according to this embodiment, net sidecut product withdrawal conduit 68 communicates through a sidecut liquid reflux system including a recycle of sidecut liquid back to product section 16, below sidecut liquid collection system 70. Sidecut liquid collection system 70 preferably lacks a liquid downcomer, such that downward liquid flow is prevented as long as sidecut liquid level 72 is maintained below the vertical height of sidecut collection system vapor risers 74. As shown in FIG. 1, sidecut liquid collection system 70 may include, in addition to sidecut collection system vapor risers 74, sidecut collection well 76. According to a particular embodiment, sidecut liquid collection system 70 comprises a solid tray, such as a chimney tray, extending over a circular cross section of the column and further comprises a plurality of vapor risers, which may be capped.

According to the embodiment shown in FIG. 1, sidecut liquid conduit 78 is used to provide liquid flow from above sidecut liquid collection system 70 to product section 16 below sidecut liquid collection system 70. Sidecut liquid conduit 78 is shown in FIG. 1 as being external to the column and thereby capable of being readily controlled using a control valve, coupled with flow and/or liquid level measurement systems (not shown). It is also possible for sidecut liquid conduit 78 to be located within the column. In addition to controlling liquid flow through sidecut product withdrawal conduit 68, sidecut liquid reflux system can also control liquid flow from sidecut liquid collection system 70 through sidecut liquid conduit 78 to product section 16. According to other embodiments, no sidecut liquid is returned to product section, such that the total liquid flow in sidecut liquid conduit 78 is removed from the column in sidecut product withdrawal conduit 68. Sidecut liquid conduit 78 for the delivery of sidecut liquid as internal reflux from above to below sidecut liquid collection system 70 normally terminates at a liquid flow distributor (not shown) within the column.

Advantageously, the column of FIG. 1 includes vapor isolation system 44, located in a lower portion of the column above common lower section 20, for control of vapor flows. The bottom end of dividing wall 12 is shown extending through vapor isolation system 44, and particularly through a liquid downcomer 46 of this vapor isolation system 44, although it is possible in alternative embodiments for vapor isolation system 44 to be positioned completely below dividing wall 12. Vapor isolation system 44 comprises a blind tray portion, which can include multiple tray sections, for blocking internal, upward vapor flow across all or substantially all of a lower cross section 50 of the column. This cross section may correspond to that in which all or some of the blind tray portion of vapor isolation system 44 resides. Preferably all internal upward vapor flow is blocked across vapor isolation system 44 which may, for example, include one or more vertically extending liquid downcomers 46. Vapor isolation system 44 preferably lacks a vapor riser, such that upward vapor flow is prevented as long as lower liquid level 34 is maintained, using lower liquid collection system 32, above the bottom of liquid downcomer(s) 46 (i.e., the lower liquid level 34 effectively seals the opening(s) of liquid downcomer(s) 46 to prevent the passage of rising vapor).

As shown in FIG. 1, therefore, vapor isolation system 44 includes features such as liquid overflow weir 48 and/or one or more liquid downcomers, extending above and/or below the plane of the blind tray portion. According to a particular embodiment, vapor isolation system 44 comprises a solid tray extending over an entire cross section of the column and further comprises a plurality of liquid downcomers.

FIG. 1 further illustrates the use of vapor conduits Ma, 54b to provide vapor flow from below the vapor isolation system 44 to both feed and product sections 14, 16 on opposite sides of dividing wall 12. Both vapor conduits Ma, 54b, which provide fluid communication to feed and product sections 14, 16, are shown in FIG. 1 as being external to the column and thereby readily controlled using control systems including vapor flow control valves 56a, 56b and vapor flow measurement (indication) devices 58a, 58b. It is possible, however, for such conduits to be located within the column, in which case the blind tray portion of vapor isolation system 44 can still function to block internal, upward vapor flow when the control valves or other liquid flow control devices are completely closed or blocked. Conduits Ma, 54b for the delivery of vapor flows from below to above lower cross section 50 normally terminate at vapor flow distributors (not shown) within the column. Vapor flow rates through each of vapor flow control valves 56a, 56b may be monitored by instrumentation, for example which measures a pressure drop across each of these valves. Since generally no vapor product is removed proximate the vapor isolation system 44, the total flow of vapor withdrawn in vapor conduits 54a, 54b is normally returned to the column using a vapor bypass control system for controlling the flow of vapor through the vapor conduits 54a, 54b to either or both of the feed and product sections 14, 16. Liquid sealing of liquid downcomer 46 prevents upward vapor flow from avoiding the vapor bypass control system. According to other embodiments, some vapor product may be removed (e.g., for sampling) or even a substantial quantity may be removed from vapor isolation system 44 as a vapor product.

Lower liquid collection system 32, like upper liquid collection system 24 comprises a solid tray portion (in this case a second solid tray portion), which can include one or more tray sections, for maintaining the liquid level within the one or more liquid downcomers 46 of vapor isolation system 44. In a preferred embodiment, both upper and lower liquid collection systems 24, 32 comprise chimney trays.

Lower liquid collection system 32 can, according to particular embodiments, effectively block internal, downward liquid flow across all or substantially all of a bottom cross section 60 of the column, below lower cross section 50. This cross section may correspond to that in which all or some of the solid tray portion of lower liquid collection system 32 resides. Preferably all internal downward liquid flow is blocked across lower liquid collection system 32 which may, for example, include blind tray sections. Also, these blind tray sections, like those in upper liquid collection system 24, may have vertically extending risers, in this case capped lower vapor risers 62. Lower liquid collection system 32 preferably lacks a liquid downcomer, such that downward liquid flow is prevented as long as lower liquid level 34 is maintained below the vertical height of lower vapor risers 62 and above the bottom edge of dividing wall. As shown in FIG. 1, lower liquid collection system 32 is not necessarily coplanar, but may include features such as lower vapor risers 62 and/or lower collection well 64, extending above and/or below the plane of the solid tray portion. According to a particular embodiment, lower liquid collection system 32 comprises a solid tray, such as a chimney tray, extending over a circular cross section of the column and further comprises a plurality of vapor risers.

According to the embodiment shown in FIG. 1, lower liquid conduit 66 is used to provide liquid flow from above lower liquid collection system 32 to common lower section 20 below lower liquid collection system 32. Lower liquid conduit 66 is shown in FIG. 1 as being external to the column and thereby capable of being readily controlled using a control valve, coupled with flow and/or liquid level measurement systems (not shown). Since generally no liquid product is removed from lower liquid collection system 32, generally the total flow of liquid withdrawn is returned as reflux. A lower reflux system controls liquid flow from lower liquid collection system 32 through lower liquid conduit 66 to common lower section 20. According to other embodiments, some liquid product may be removed (e.g., for sampling) or even a substantial quantity may be removed from lower liquid collection system 32 as a liquid product.

It is also possible for lower liquid conduit 66 to be located within the column, in which case the first solid tray portion of lower liquid collection system 32 can still function to block internal, downward liquid flow when the control valves or other liquid flow control devices are completely closed or blocked. Conduit 66 for the delivery of liquid flow from above to below bottom cross section 60 normally terminates at a liquid flow distributor (not shown) within the column.

Dividing wall columns as described herein may be used in the fractional distillation of a feed comprising a number of different compounds (e.g., hydrocarbon compounds) into an (i) overhead product enriched in one or more low boiling compounds present in the feed, (ii) a bottoms product enriched in one or more high boiling compounds present in the feed, and (iii) a sidecut product enriched in one or more intermediate boiling compounds present in the feed. The term "enriched" in a compound refers to a higher concentration of that compound in the product, relative to the feed. The columns may be employed to perform a wide variety of fractionation operations, particularly in the petroleum and petrochemical industries. These include the separation of hydrocarbons (e.g., having from about 4 to about 12 carbon atoms) of a feed into fractions having a similar relative volatility or boiling point. Product fractions can include crude oil-derived products of petroleum refining and petrochemical processing, such as naphtha, diesel fuel, kerosene, liquefied petroleum gas (LPG), and polymers. In some cases, fractions can be specific compounds, or specific types of compounds, separated from others of the same chemical or functional class, for example alcohols, ethers, alkylaromatics, monomers, solvents, inorganic compounds, etc.

Embodiments of the invention are therefore directed to fractionation methods comprising passing a feed comprising, for example, hydrocarbons or other compounds as described above into the feed section of a fractional distillation column having, for example, a dividing wall and any, some, or all of the other features as illustrated in FIG. 1. Representative methods further comprise blocking downward liquid flow across all or substantially all of an upper cross section of the column with an upper liquid collection system and flowing liquid from above the upper liquid collection system to both feed and product sections of the column. The methods also comprise blocking upward vapor flow across all or substantially all of a lower cross section of the column with a vapor isolation system and flowing vapor from below the vapor isolation system to both the feed and product sections of the dividing wall fractional distillation column. The methods may further comprise withdrawing (i) an overhead product, enriched in low boiling hydrocarbons, from the column above the upper liquid collection system, (ii) withdrawing a sidecut product, enriched in intermediate boiling hydrocarbons, from the product section of the column, and (iii) withdrawing a bottoms product, enriched in high boiling hydrocarbons, from the column below the vapor isolation system of the column.

Overall, aspects of the invention are directed to methods comprising monitoring or controlling vapor flows to feed and product sections of a dividing wall fractional distillation column Particular aspects of the invention are directed to dividing wall fractional distillation columns and methods for using these columns as described above, wherein, advantageously, a ratio of product section vapor flow to feed section vapor flow ($V_p/V_f$ ratio) may be controlled and/or monitored. Ratios of liquid and vapor flows in the feed section ($L_f/V_f$ ratio) and in the product section ($L_p/V_p$ ratio) may also be controlled and/or monitored. According to more specific embodiments, these ratios are controlled in response to a desired or measured characteristic of the sidecut product. In view of the present disclosure, it will be seen that several advantages may be achieved and other advantageous results may be obtained. Those having skill in the art, with the knowledge gained from the present disclosure, will recognize that various changes could be made in the above apparatuses and methods without departing from the scope of the present invention. Mechanisms used to explain theoretical or observed phenomena or results, shall be interpreted as illustrative only and not limiting in any way the scope of the appended claims.

The following example is set forth as representative of the present invention. The example is not to be construed as limiting the scope of the invention as other equivalent embodiments will be apparent in view of the present disclosure and appended claims.

EXAMPLE

Figure 2:
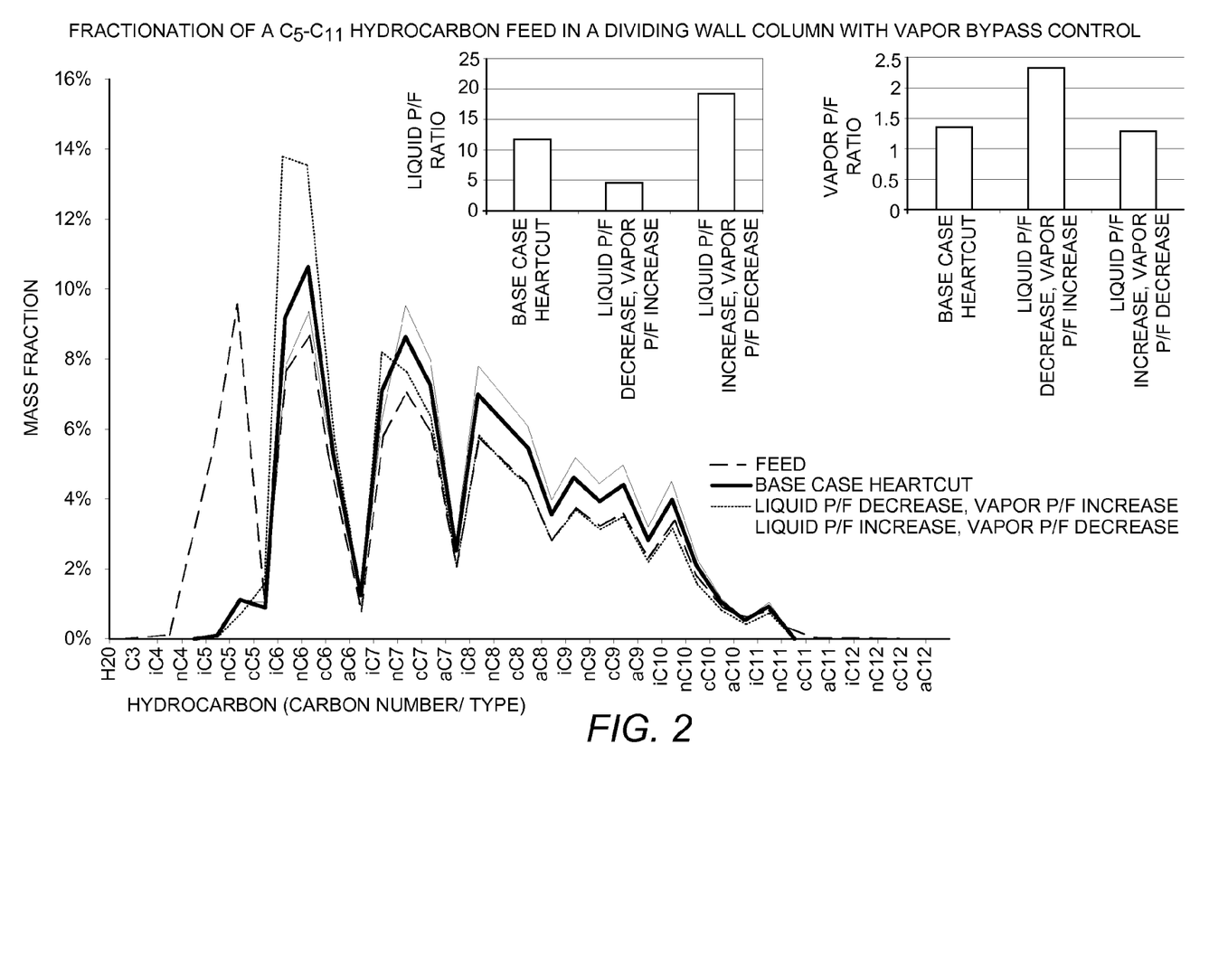
FIG. 2 illustrates the effect, on the carbon number distribution hydrocarbons in a sidecut, of varying vapor flows and liquid flows to feed and product sections of a dividing wall distillation column as described herein.

Variations in the composition of the sidecut product of a dividing wall fractional distillation column were modeled for a commercial feed comprising predominantly naphtha boiling range ($C_5$-$C_{11}$) hydrocarbons. In particular, UniSim® process simulation was used to determine the expected effects of varying both the product section vapor flow to feed section vapor flow ($V_p/V_f$ ratio) and product section liquid flow to feed section liquid flow ($L_p/L_f$ ratio), as described above. FIG. 2 illustrates the distribution of hydrocarbons by carbon number and hydrocarbon type, namely branched (or iso; "i"), normal ("n"), cyclic ("c"), and aromatic ("a") for the commercial feed and (1) a base case heartcut (or sidecut) product, as well as (2) a heartcut (or sidecut) product obtained when the $V_p/V_f$ ratio is increased and the $L_p/L_f$ ratio is decreased relative to the base case, and (3) a heartcut (or sidecut) product obtained when the $V_p/V_f$ ratio is decreased and the $L_p/L_f$ ratio is increased relative to the base case.

Figure 3:
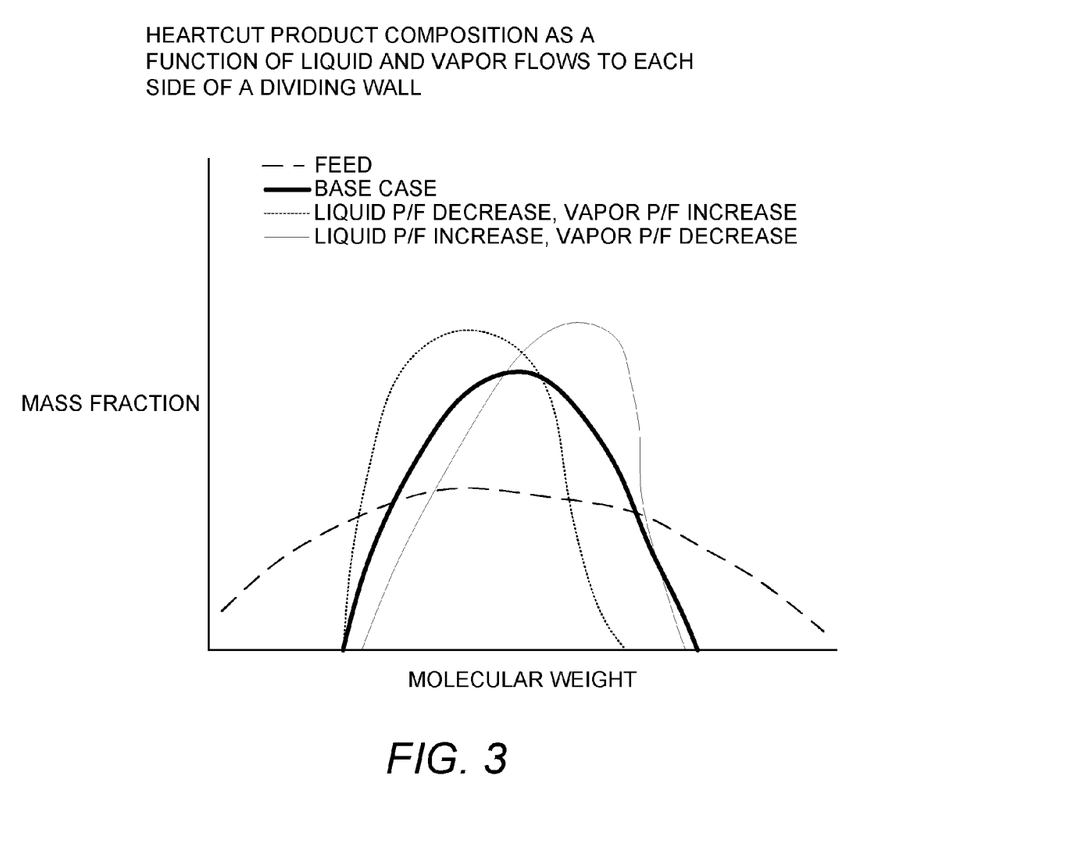
FIG. 3 illustrates the effect, on the molecular weight distribution of hydrocarbons in a sidecut, of varying vapor flows and liquid flows to feed and product sections of a dividing wall distillation column as described herein.

FIG. 3 illustrates approximately the molecular weight distribution of hydrocarbons in a feed, a heartcut (or sidecut) product obtained under base case operating conditions, and heartcut (or sidecut) products obtained by changing flow ratios directionally as described with respect to heartcut products (2) and (3) above.

As is apparent from FIGS. 2 and 3, the ability to control both the $V_p/V_f$ ratio and the $L_p/L_f$ ratio in a dividing wall fractional distillation column affords considerable flexibility in terms of biasing a heartcut (or sidecut) product composition toward higher or lower molecular weight components. Alternatively, the control of these ratios allows the column to operate more robustly in response to deviations or upsets in the feed composition (i.e., in terms of maintaining a desired heartcut product composition).

The invention claimed is:

1. A dividing wall distillation column comprising:
   a) a dividing wall separating a column into interior, parallel feed and product sections;
   b) an upper liquid collection system comprising a first solid tray portion for blocking downward liquid flow across all or substantially all of an upper cross section of the column;
   c) a vapor isolation system located below the upper liquid collection system and comprising a blind tray portion for blocking upward vapor flow across all or substantially all of a lower cross section of the column;
   d) one or more upper liquid conduits providing fluid communication from above the upper liquid collection system to either or both of the feed and product sections of the column;
   e) one or more vapor conduits providing fluid communication from below the vapor isolation system to either or both of the feed and product sections of the column; and
   f) a lower liquid collection system comprising a second solid tray portion for maintaining a liquid level within a liquid downcomer of the blind tray portion.

2. The column of claim 1, wherein a portion of the dividing wall extends through a portion of the liquid downcomer below the blind tray portion.

3. The column of claim 1, wherein the upper liquid collection system and the lower liquid collection system both comprise chimney trays.

4. The column of claim 1, further comprising an upper liquid reflux system for controlling the flow of liquid from the upper liquid collection system through the one or more upper liquid conduits to either or both of the feed and product sections.

5. The column of claim 1, further comprising a vapor bypass control system for controlling flow of vapor through the one or more vapor conduits to either or both of the feed and product sections.

6. The column of claim 1, wherein the upper liquid collection system is located above the dividing wall.

7. The column of claim 1, wherein the lower liquid collection system is located below the dividing wall.

8. The column of claim 1, further comprising a lower liquid reflux system for controlling a flow of liquid from the lower liquid collection system through a lower liquid conduit to below the lower liquid collection system.

9. The column of claim 1, further comprising (i) a net overhead product withdrawal conduit in communication with the column above the upper liquid collection system and (ii) a net bottoms product withdrawal conduit in communication with the column below the lower liquid collection system.

10. The column of claim 9, wherein the net overhead product withdrawal conduit communicates with the column through an overhead liquid condensation and reflux system comprising an internal or external overhead condenser.

11. The column of claim 9, wherein the net bottoms product withdrawal conduit communicates with the column through a bottoms liquid reboiling and reflux system comprising an internal or external bottoms reboiler.

12. The column of claim 1, further comprising a net sidecut product withdrawal conduit in communication with the product section of the column.

13. The column of claim 12, wherein the net sidecut product withdrawal conduit communicates with the column through a sidecut liquid reflux system for controlling a flow of liquid from a sidecut liquid collection system through a sidecut liquid conduit to below the sidecut liquid collection system and into the product section.

14. A method for fractional distillation of a feed into at least an overhead product, a bottoms product, and a sidecut product, the method comprising passing a feed to the feed section of the dividing wall fractional distillation column of claim 1.

15. The method of claim 14, wherein the feed comprises hydrocarbons having from about 4 to about 12 carbon atoms.

16. A method for fractionating a hydrocarbon-containing feed, the method comprising:
   a) passing the feed into a feed section of a dividing wall distillation column having an interior separated into the feed section and a parallel product section by a vertically extending dividing wall,
   b) blocking downward liquid flow across all or substantially all of an upper cross section of the column with an upper liquid collection system;
   c) flowing liquid from above the upper liquid collection system to both feed and product sections of the column;
   d) blocking upward vapor flow across all or substantially all of a lower cross section of the column with a vapor isolation system located below the upper liquid collection system;
   e) flowing vapor from below the vapor isolation system to both the feed and product sections of the dividing wall fractional distillation column;
   f) withdrawing an overhead product, enriched in low boiling hydrocarbons, from the column above the upper liquid collection system;
   g) withdrawing a sidecut product, enriched in intermediate boiling hydrocarbons, from the product section of the column;
   h) withdrawing a bottoms product, enriched in high boiling hydrocarbons, from the column below the vapor isolation system of the column.

17. The method of claim 16, wherein, in step (e), a ratio of product section vapor flow to feed section vapor flow ($V_p/V_f$ ratio) is controlled or monitored.

18. The method of claim 17, wherein the $V_p/V_f$ ratio is controlled in response to a desired or measured characteristic of the sidecut product.

19. The method of claim 16, further comprising monitoring or controlling vapor flows to feed and product sections of a dividing wall fractional distillation column.

* * * * *